United States Patent Office 3,543,247
Patented Nov. 24, 1970

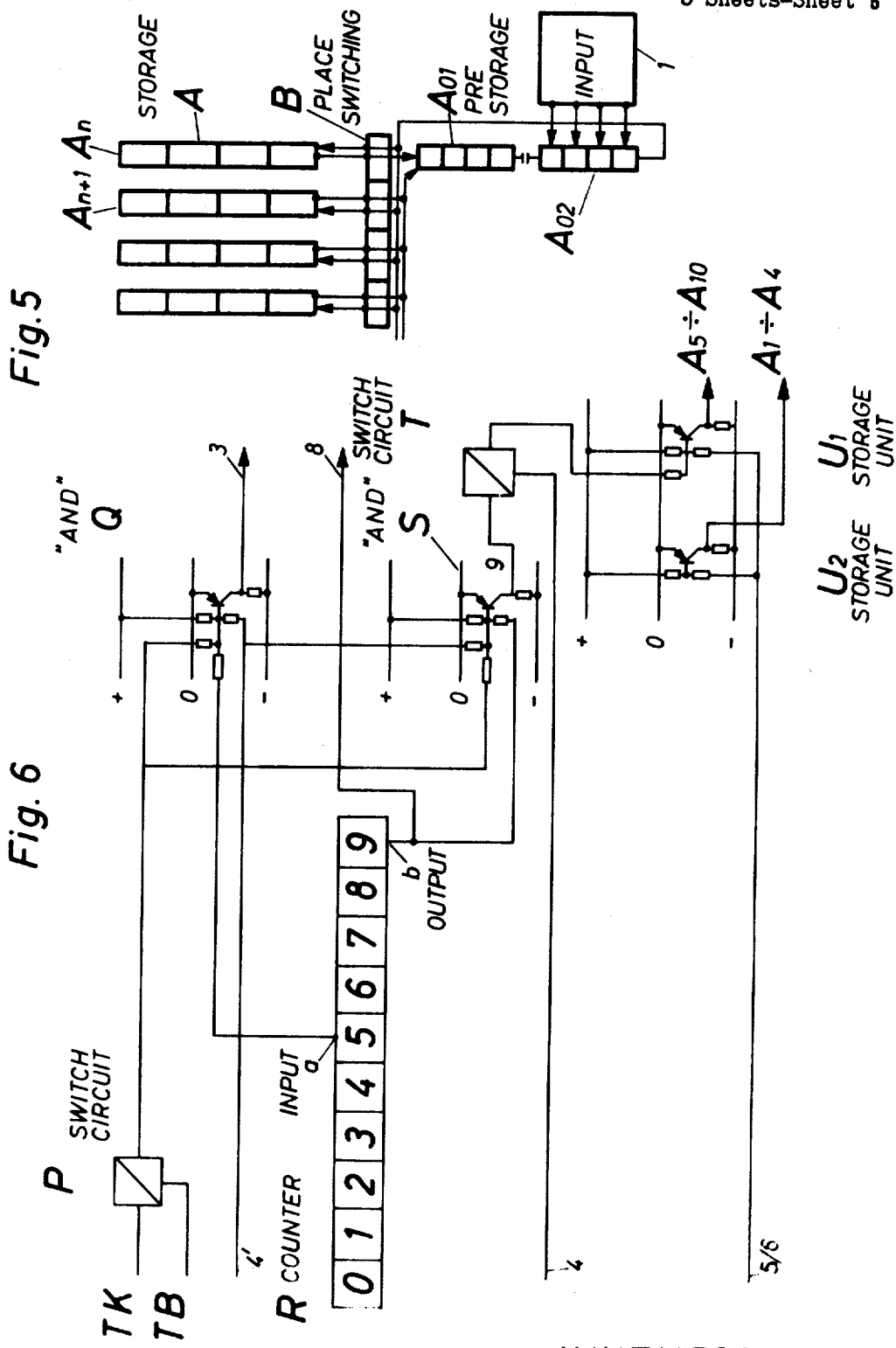

3,543,247
STORAGE DATA SHIFTING SYSTEM
Günter Schrem, Albeck, Germany, assignor to Walter-Buromaschinen GmbH, Gerstetten-Wurttemberg, Germany, a limited-liability company
Filed Jan. 4, 1968, Ser. No. 695,733
Claims priority, application Germany, Jan. 5, 1967, W 43,119
Int. Cl. G11c 19/00
U.S. Cl. 340—172.5
12 Claims

ABSTRACT OF THE DISCLOSURE

A data processing system including pulse responsive means for shifting data in a step-by-step manner between the group places of a storage means, whereby additional data may be keyed into the input side of the storage means without disturbing the shifted data stored at the output side. When the keyed-in symbols reach a predetermined number of digit places, the symbols are automatically or selectively shifted blockwise toward the output side of the storage member.

---

The invention relates to a switching circuit for an input storage member for electronic data processing systems with a visual readout for the symbols (i.e. words or characters) that have been fed into a storage member, and having a device for shifting the keyed-in symbols one space at a time toward the output side of the storage member whenever another symbol is fed in at the input side of the storage member.

Table top electric calculators are known in which the recorded digits, before their delivery to the calculators, are fed into an intermediate storage device where they are made visible for control purpose. Devices are also known by which the digits in said storage device are shifted automatically one step away from the inlet side of the storage device each time when another digit is keyed in. By means of such an apparatus, it is possible to feed a series of digits, one at a time, into the calculating device, beginning in the highest place, so that eventually the entire series of digits is stored in the storage places on the entrance side, beginning with the digit that was fed in last, in the order in which they were fed in. Obviously, the place shifting is effected here in a purely electronic manner and not, as was previously customary, by means of noisy, slow and cumbersome shuttle or other mechanical device.

It is also known to incorporate the technical improvements of table electric calculators into the input device of electronic data processing systems.

By using such intermediate or buffer storage members in input devices, the danger of partially or completely blocking the data processing apparatus during the entire duration of the feed-in process will be avoided. If the symbols that are to be fed in are collected in a storage register independently of the data processing system, then the data processing apparatus will be available without restriction during this time for other uses.

By displaying the symbols or characters as they are fed into the storage devices, they can be controlled or edited prior to their delivery to the data processing apparatus. In this manner, any omissions or errors which may occur during the keying in operation, will not be transmitted directly to the storage member of the automatic calculator, where such mistakes would either be further processed until the machine recognizes the mistake, or in case the operator correctly registers the erroneous recording, would necessitate the inconvenience of recalling the erroneous keying from the data processing apparatus.

There frequently appears in response to a data processing command the sequence of a symbol from several groups. An electronic recall from a storage may include the command to the data processing apparatus from several digit blocks, namely an article number, the piece number, the time of need and a number that is characteristic of the place where the goods are to be delivered.

Orders to large commercial houses may consist of several digit blocks which may indicate a customer number, a postal zone to represent the location of the customer, an article number and the number of articles ordered.

With such inputs its is obviously desirable to have each block of digits controlled individually immediately after keying of its last digit. For that purpose it is necessary to separate such a digit block from subsequent inputs and to render it eaily recognizable in a previously provided storage place. Obviously the keyed-in digit blocks should not be delivered to the data processing apparatus until after all the keying has been completed so that all the digit blocks relating to one order have been fed in and controlled. It is therefore desirable for each digit block, after having arrived at its intended place number, to be automatically pushed into prearranged storage digit blocks and where the block can be readily inspected by the operator.

It is the principal object of the present invention to provide for the automatic blockwise shifting of symbol groups in the input devices of electronic data processing systems into prearranged places in an input storage member.

This object is attained by having the known electronic space shifting continue, upon reaching a predetermined insertable place number, until the symbol group that is to be shifted has arrived at the place where it is to be stored. The shifting operation is performed automatically.

During the keying of another symbol into the input storage member, the symbols that have already been keyed in are shifted in a known manner one place further toward the output side of the storage member, without however having the already shifted symbol groups subjected to further shifting. Besides this automatic shifting of the blocks of symbols, there must also exist the possibility of manual shifting by depressing a special shifting key on the operator's keyboard.

The hand-operated shifting is particularly important when a symbol group such as the digit block of a quantity designation does not occupy all the places that have been provided therefor in the storage member. In consequence of a shifting command from such a key, the non-filled places toward the output side of the input storage member will be covered by O or empty signs, so that upon reaching the complete block length, the automatic shifting of the entire block is initiated by the special circuit. By this hand-operated step, the keying in of the zeros before the digit block is rendered unnecessary because the block under consideration will still be stored in the correct storage places.

The shifting of the keyed-in symbol one step in the direction of the output side of the storage member by the keying in of a further symbol can be accomplished in various ways, depending on the method of storage and of switching the storage cells. A first method is as follows:

When a symbol is keyed in, it will arrive in an entrance storage member in binary a form composed of several bits. At the same time a START impulse is given by the operator or from the input storage member, which will be transmitted over a suitable switching element to put an impulse generator into operation. The impulses proceeding from the latter are evaluated by a codifying circuit into three successive commands.

The first "extinguishing" command serves to extinguish the value in storage place, beginning at the output side of the storage member. The subsequent second "shifting" command effects shifting of the value from a place adjacent the input side to the place that has just been extinguished. The third "further setting" command serves to conduct the subsequent extinguishing command into the place next to the input side, from which the value was previously transferred to the place at the output side. This extinguishing command follows as soon as the command for further setting is execut d, and now causes extinction of that place at the output side. If all the places have been shifted one step toward the output side, then the last impulse, which will itself be in the form of a "further setting" order, will give a blocking command which will be transmitted across the previously mentioned switching element to stop the impulse generator.

A further possibility for automatically shifting the stored values one place further each time when another symbol is keyed in, can be achieved by means of another circuit in which the feeding into a storage input place of a symbol in binary form will produce a start-impulse which will be transmitted across a suitable switching element to put an impulse generator into action. The impulses of this generator are codified into two impulses. By the first impulse the values from all places in the storage member are read out, in order to be transferred to the places at the output side. While these values are on their way, the same impulse will be transmitted across another circuit to simultaneously extinguish all places in the storage member. It is necessary for the transferring impulses to last longer than the extinguishing impulses so that at last all the values will have been shifted one step further toward the output side of the storage member. The second impulse is transmitted across the above mentioned switching element to stop the impulse generator.

Another possibility for place shifting is provided by the use of a prestorage member. The feeding in of a symbol in binary form across the keyboard is first performed upon an input place in the storage member. At the same time the value in the first place in the prestorage member is transferred to an intermediate storage member. The value that has just been fed in now arrives by the space switching in the liberated first storage place. The storage places are now switched one place further toward the output side. The value in the second member after the original value of the first storage place has passed from the latter to the input storage place, and from there to the second place in the prestorage member.

The first storage place has now received the newly introduced value, the value that was originally introduced into the first place having now been shifted to the second place, and the value which was originally in the second place is now in the intermediate storage place or in the entrance storage place. During the further switching of storage places the entire process will be continued, step by step, into the succeeding places, until the entire storage member is traversed and the last space switching impulse has stopped the place shifting by stopping the impulse generator.

Because of the very short shifting times of the prestorage places, this kind of shifting is very quick, but that is not of any great importance in view of the relatively long keying time.

The switching steps mentioned here for placewise shifting can according to this invention also be used for shifting entire groups of symbols. For that purpose there is provided in the input apparatus a special circuit, already mentioned above, which in response to a special start command becomes activated for example, by the depression of a special key.

For this special circuit, a counting device is necessary which has in it a number of places that is equal to the number of storage places. This counting device registers the number of storage places that are occupied on the input side. If by keying in of the further symbols a certain prescribed block length is reached, then this counting device will give an impulse which with a switched in special circuit and in the absence of any output will give a start command for shifting the entire block. This shifting is a continuous repetition of the above described place shifting, until the complete block has by a step-by-step advance occupied all the available storage places. The block shifting is stopped by an impulse from the storage place which fixes the block beginning on the output side as soon as such storage place is covered. The stop command which terminates the blockwise shifting within the special switching time, will switch off the impulse generator as soon as the last shifting step is performed, just as during the space shifting over the above mentioned switching element.

In order that the groups of symbols which have already been shifted to the output side will not be further shifted either during continued feeding in of symbols or by the shifting of further blocks, the storage member is divided into compartments whose number of places is equal to the corresponding block numbers. By covering one of these storage compartments with a certain symbol group, such a compartment will be rendered by a suitable circuit non-accessible to further shifting commands. By subsequent placewise shifting resulting from additionally fed-in symbols, this storage compartment will not be further affected, so that the already shifted blocks will not be further shifted.

Other objects and advantages of the present invention will be apparent upon reference to the accompanying description when taken in conjunction with the following drawings wherein.

Figure 3:
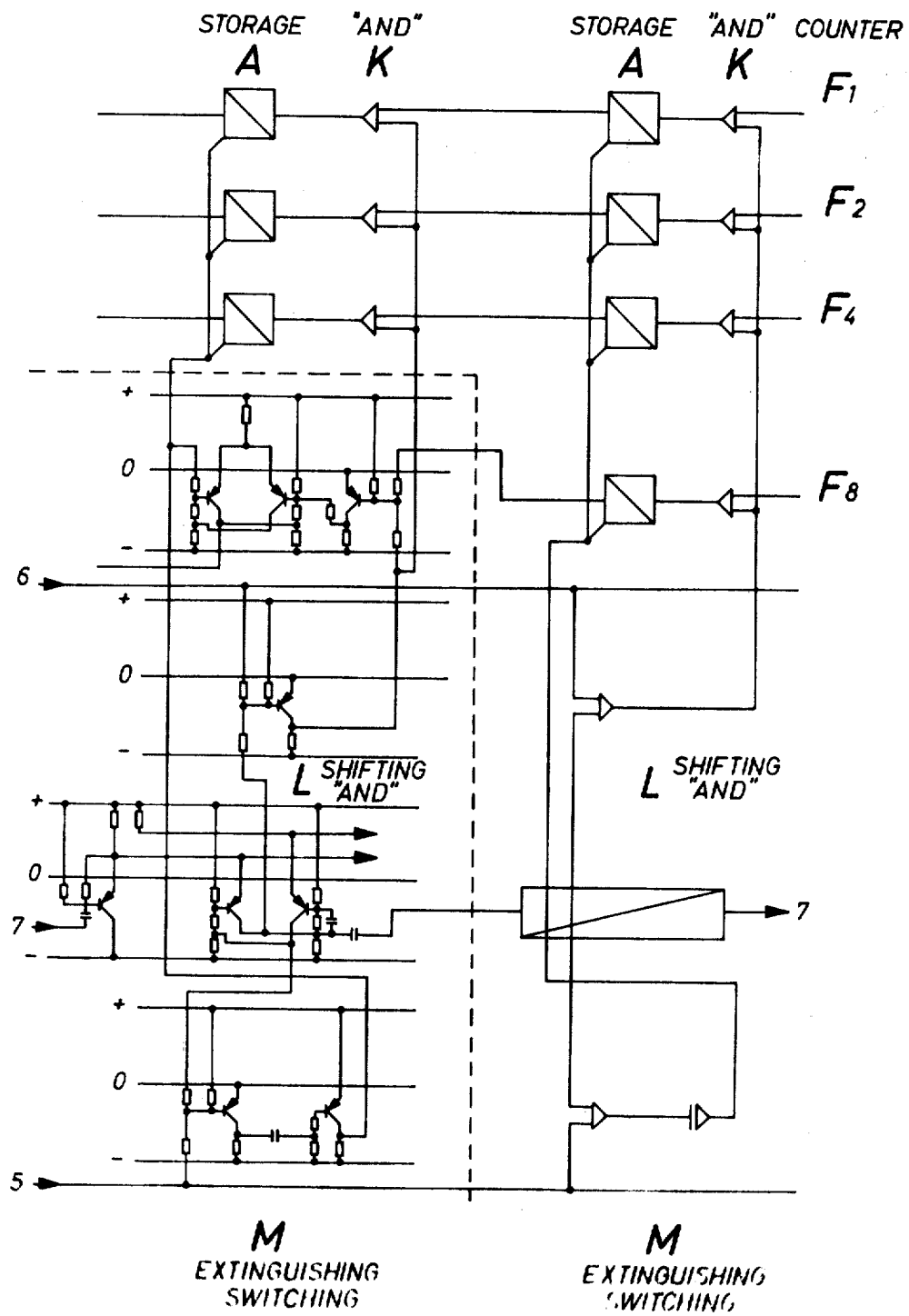

FIG. 3 discloses a first switching embodiment for shifting one step the symbols stored in transistorized storage means together with the actuating circuit for the visual readout.

Figure 4:
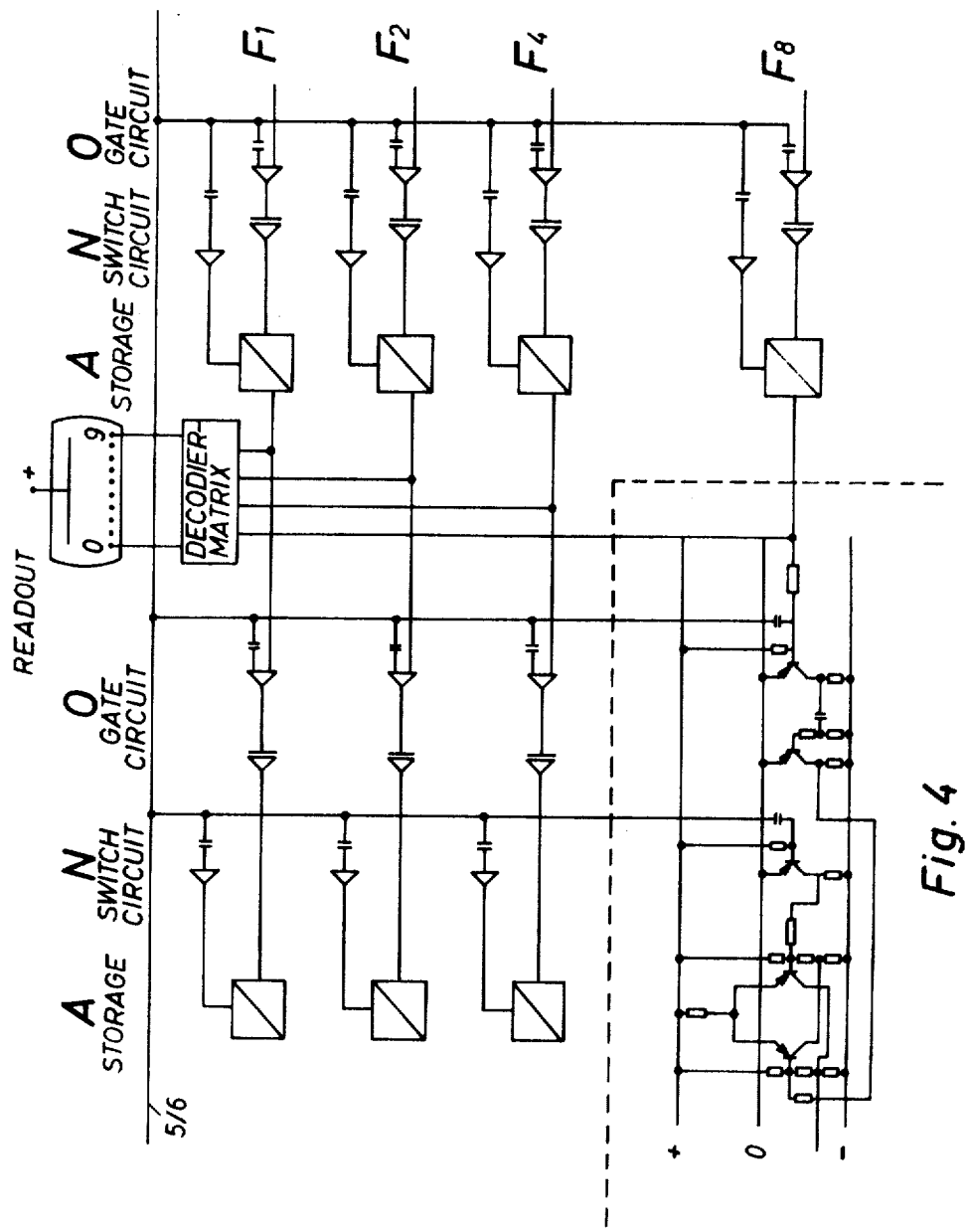

FIG. 4 shows a second switching embodiment for shifting one step the symbols stored in the transistorized storage means together with the visual readout.

FIG. 5 shows a third switching embodiment for one step shifting of symbols that have been stored in a core storage means; and FIG. 6 shows a switching arrangement including separate switching means to effect blockwise shifting of the stored values.

Proceeding next to the drawing wherein like reference symbols indicate the same parts throughout the various views preferred modifications of this invention will now be described in detail.

Figure 1:
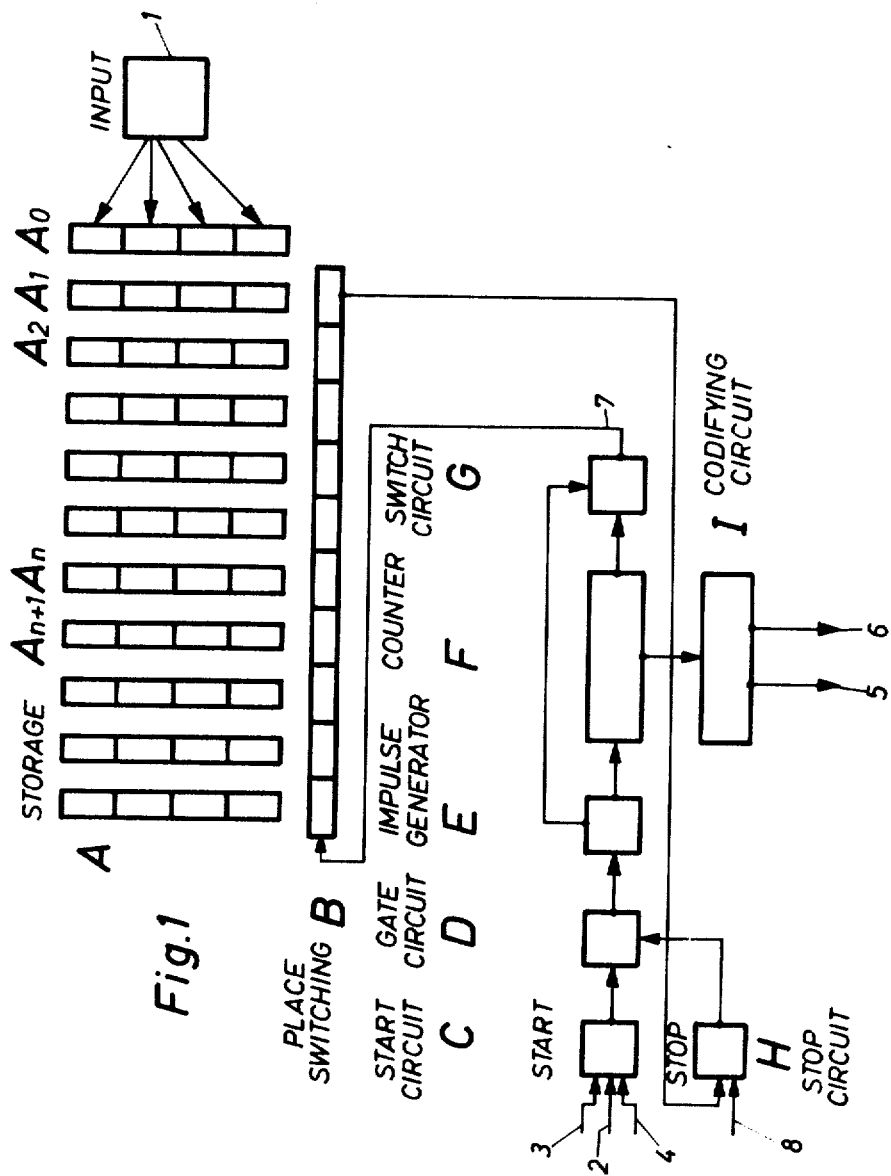
FIG. 1 shows schematically the construction of a transistor or magnetic core storage unit as used in this invention together with a position switching circuit.

Referring now to the drawing, FIG. 1 illustrates a ten-unit transistor or core storage means A to which a binary symbol is applied from a known keying device 1 via an entrance storage member $A_0$. This symbol is immediately transferred from the input side toward the output side into the first storage place $A_1$ of the input storage means A. The further transfer of the symbol is effected by a starting impulse 2 which, when a value is given by the keying device 1 to the entrance storage $A_0$ effects transfer one step further of all values in the storage member which do not belong to a block that has already been shifted, such further transfer being effected by means of one of the switching arrangements shown in FIGS. 3 to 5.

FIG. 1 also shows a place switching means B which is so operable that when a new symbol is keyed into the input storage place $A_0$, all transferable values that are already present therein will actually be transferred one step further. A starting command from "initiating key" 2 of the keying device 1, a starting command from a program 3, or a starting command "output" 4 is transmitted through the start circuit C into the gate circuit D comprising, for example, a flip-flop circuit. By this starting impulse the flip-flop in gate circuit D will be triggered into working condition and will remain in such condition until a stop command from stop circuit H throws the flip-flop back into its original condition. If the flip-flop is in working condition, it will put an impulse generator E into operation. This impulse generator has connected to it a counting means F including a pair of flip-flops providing four different settings. One of the flip-flops defines a codifying circuit I having an extinguishing output 5 and a shifting output 6. Upon the occurrence of the last impulse from counting means F and an impulse from the impulse generator E, an impulse 7 is formed in the switch circuit G that is transmitted to the place switching means B to switch the latter one step further. When the place switching means B, after having passed through all the storage places, arrives at the last place, an impulse is fed to the stop circuit H which gives a blocking command to the gate flip-flop D, whereby the latter will be switched back to its initial condition to interrupt operation of the impulse generator E.

FIGS. 3, 4 and 5 show three different switching embodiments for shifting keyed-in symbols away from the input storage place one place each time when another symbol is keyed in. These circuits are designed in such a manner that under the control of either the place switching means B (FIG. 1) or the separate switching means for blockwise shifting (FIG. 6), they can also be used for shifting the complete blocks from predetermined places at the input side of the storage unit in the direction of the output side thereof.

FIG. 3 shows a circuit for shifting symbols in a group of transistors having positions $A_n$ and $A_{n+1}$, respectively. Each storage place consists of four flip-flops, which are arranged in the form of a tetrad. By corresponding deposition of bits, a total of 16 different symbols can be formed in each tetrad.

To illustrate the shifting of a value in tetrad $A_n$ to tetrad $A_{n+1}$, it will be assumed that the place switching means B is in the $(n+1)$ position, so that flip-flop $B_{n+1}$ is rendered operative. An impulse 5 which has been evaluated in FIG. 2 from the counting means F by the codifying circuit I and which carries an extinguishing command, reaches the $(n+1)$ position. Simultaneously with the operation of flip-flop $B_{n+1}$, this impulse goes through extinguishing switching means $M_{n+1}$ and extinguishes the value in tetrad $A_{n+1}$, whereby all four flip-flops are brought into the null setting. The subsequently following impulse 6 from the codifying circuit I (FIG. 2), which now brings the shifting command, reaches the $(n+1)$ position via another conductor and permits the first shifting AND circuit $L_{n+1}$ to deliver a further command to the switching second shifting AND circuits $K_{n+1}$. Each of these second shifting AND circuits K comprises four AND circuits through which, together with the bits from the flip-flops of the tetrad $A_n$, impulses are given to the associated flip-flops of tetrad $A_{n+1}$ so that the storage place $A_{n+1}$ will have in it the same value as that which is stored in place $A_n$. After this shifting the system B is switched by an order from conductor 7 into the position $n$ while at the same time the flip-flop $B_{n+1}$ is conditioned back into its original position. The subsequently following extinguishing impulse 5 from the codifying circuit I of the counting means F (FIG. 2) gives, together with the bit from the flip-flop $B_n$ of the place switching means B over the extinguishing switching circuit $M_n$, the extinguishing impulse to the four flip-flops of tetrad $A_n$, all of which are now brought into their original settings. As previously in the circuits $(n+1)$ an impulse is now sent to the second shifting AND circuits $K_n$ by the subsequent shifting command 6, together with the bit from the flip-flop $B_n$, via the first shifting AND circuit $L_n$. The bits from the flip-flops of preceding tetrad $A_{n-1}$ from impulses which exhibit the same value in tetrad $A_n$ as in position $A_{n-1}$. The place switching system B is now switched one place further again, namely in the position $(n-1)$. The flip-flop of position $B_n$ is simultaneously brought into its original position. The sequence of steps here described is repeated until all the values in the storage unit are shifted each time one place to the left. The place switching means B has then reached its last place $B_1$. As a final place-shifting step, there will be formed at the end of the place-switching means B, out of place $B_1$, an impulse which by the stop circuit H of FIG. 2 is formed into a blocking impulse by which the flip-flop in switching circuit D is tripped back into its original condition, whereby the impulse generator in switch circuit E is switched off and the place shifting discontinued.

FIG. 4 shows a second switching embodiment for shifting a value in a transistor storage unit. Each place in the storage unit, as before, includes four flip-flops which are combined into a tetrad. The present elaboration will be confined to the shifting of a value from an $n$ position in the storage unit to an $(n+1)$ position. A shifting and extinguishing impulse $(5/6)$ from the codifying circuit I of FIG. 2 arrives in all the tetrads of this storage unit. Each of the remaining values in the storage unit will then be shifted one step from the input side to the output side. While the shifting and extinguishing impulse, whose path is capacitatively coupled via gate means $O_{n+1}$ with the output terminals of the flip-flops, together with the bits of the place $n$, produces shifting impulses for switching the flip-flops of place $A_{n+1}$, the same impulse, functioning as an extinguishing impulse, via the switching circuit $N_{n+1}$, is used to bring the flip-flops of the tetrad $A_{n+1}$ into their original settings. It is important in this circuit for the shifting impulse to have already read out the bits from the tetrad $A_n$ at the time when the flip-flops are returned by the switch circuit N to their original settings with extinction of the stored values. The impulses from the shifting command and the bits from tetrad $A_n$ in the meantime must pass the gate circuit $O_{n+1}$ so that the flip-flop $A_{n+1}$ can again be set immediately after their extinction and in fact with the original value of place $A_n$. With this circuit all values in the storage unit can be shifted one place by a single impulse. A necessary prerequisite for such use of the circuit is however that the commands from gate circuits O must be of longer duration than the commands from switch circuits N which serve to extinguish the tetrad, just as with the transistor storage elements of FIGS. 3 and 5, is rendered unnecessary in this modified switching system. The counting means F in FIG. 2 will then require only two settings, namely for a shifting and an extinguishing command 7. The codifying circuit I is rendered superfluous in this modification.

FIG. 5 shows a switching system in which the stepwise shifting of stored values is effected by the use of a prestorage member, each prestorage place of which is formed of four prestorage elements which are arranged as a tetrad, just as with the transistor storage element of FIGS. 3 and 4. This prestorage member is known in the art as a coincidence storage member constructed with four levels. In this case two entrance tetrads $A_{01}$ and $A_{02}$ are necessary with the latter being constructed in a way similar to that of $A_0$ as shown in FIG. 1. In addition they contain an installation which is known in itself by which it is possible to bring about the transfer from $A_{01}$ to $A_{02}$.

Figure 2:
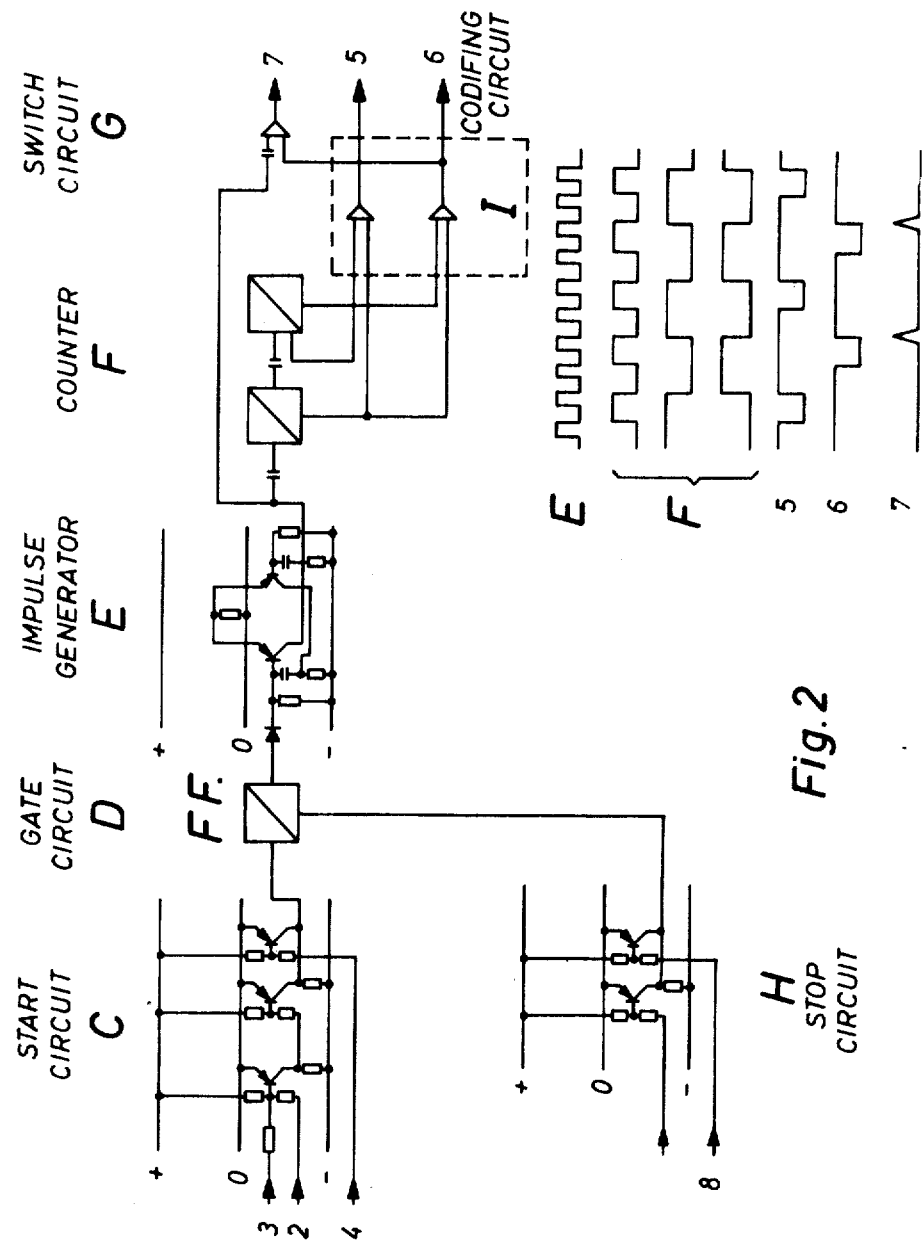
FIG. 2 shows the several circuits for actuating the position switching circuit for effecting stepwise control of the shifting without the use of special switching means.

In this modification the introduction of a symbol is effected by the keying device 1 which delivers the symbol in the binary form to the prestorage elements of entrance tetrad $A_{02}$ as illustrated in FIG. 2. The place switching means B is then in the first setting on the entrance side of the storage member. The value that was stored in tetrad $A_1$ is already read into tetrad $A_{01}$ over place $B_1$. The reading device is not shown here since it corresponds to the device employed in coincidence storage members and is not a part of the present invention. It is thus presumed to be known to those skilled in the art. At the same time the place switching means B is set one place further, so that now the place $B_2$ is in use. The value which was originally read out of tetrad $A_1$ and transferred across place $B_1$ for preliminary storage in tetrad $A_{01}$, is transferred immediately to tetrad $A_{02}$ after the latter is set free, from where it now passes over the further switched place $B_2$ and arrives in a later step at the tetrad $A_2$. In addition to this it is necessary that the digit which was previously in $A_2$ must be read into the tetrad $A_{01}$ which in the meantime has become available. The recorder switch means which reads the value out of tetrad $A_{02}$ into the prestorage element is not shown since it is known in the art and also is not immediately pertinent to the subject invention. In that manner the value which was originally stored in tetrad $A_1$ is now shifted one place further toward the output side, namely in the tetrad $A_2$, while in first place the newly keyed value has entered. After all places have been shifted one place further toward the output side, the space switching will have finished one complete cycle and the impulse at the end of the place switching means B delivers across the stop circuit H (FIG. 2) a STOP command whereby the flip-flop in gate circuit D of FIG. 2 will be returned to its original setting so as to bring the shifting process to an end.

FIG. 6 shows an example of how the switching system can be designed for automatically shifting the stored values. This special switching system is actuated by depressing a special key of the keying device by which a special switch P, for example a flip-flop, is put into operation. The counting means R serves to establish, by means of the input connection $a$, the block length that is to be shifted, which in this case is a six-place block. When the sixth place is fed in, then the resulting shifting of the previously keyed five places into second-to-sixth places of the storage member will produce from this sixth place an impulse across the connection $a$ which, together with the bit from the special switch P and the negating bit 4' from the starting command 4 which indicates that at the time there is no outstanding command will be evaluated by an AND network Q to a START command for blockwise shifting by means of the special shifting switch 3. The shifting of the symbol blocks into the prescribed storage places is effected in one or another of the three above described methods of place shifting, the required switching circuits for which are shown in FIGS. 3 to 5. This place shifting is now continued until the first place in the digit block has arrived at its intended place in the storage unit. The impulse which is delivered from this place across the output connection $b$ is used in the following two ways. First, it proceeds as impulse 8 to stop circuit H (FIG. 2), and from there as a STOP command to the flip-flop in gate circuit D which is thereby returned to its original setting so as to render inactive the impulse generator E. The impulse from $b$, together with the bit from flip-flop P and the negating bit 4' which indicates that there is no further command, is also used as an additional impulse to be evaluated by the AND circuit S into an impulse 9. The latter serves to switch a flip-flop in switch circuit T in such a manner that in the storage unit $U_1$ places 5 to 10 will be blocked during the extinguishing and shifting time, namely during the time of sending impulses 5 and 6 (FIG. 2). The result will be that during further additions to storage unit A, the block which has already been shifted to the output side of the storage unit will not be affected by such further additions. The storage unit $U_2$ for places $A_1$ to $A_4$ however is always directly connected for the reception of extinguishing and shifting impulses 5 and 6.

For reading out the stored values, it will of course be necessary that the places in the storage unit $U_1$ be made accessible to the shifting operation. This is accomplished by having the START command produce an impulse 4 (FIG. 6) which will block the switch element T against passage of impulse 9 therethrough. In this manner all the available storage places will be opened for place shifting, so as to permit reading of the stored values.

While in accordance with the provisions of the Patent Statutes the preferred form and embodiments of the invention have been illustrated and described, it will be apparent to those skilled in the art that modifications may be made without deviating from the invention set forth in the following claims.

What is claimed is:

1. In a data processing system of the type including indicating means for rendering visible the symbols that have been keyed into a storage means, the combination of means connected to a storage means for shifting the keyed-in-symbols one step at a time in the direction toward the output side of the storage means during the keying in of an additional symbol from the input side to the output side of said storage means; and means response to the keyed-in symbols reaching a predetermined number of digit places for shifting the symbols blockwise by electronically commanded shifts in the storage means toward the output side, so that additional symbols can be keyed in at the input side without disturbing those which are stored at the output side.

2. Apparatus as defined in claim 1, wherein said storage means (A) is of the multiple place type including a plurality of place groups of storage units ($A_1$ through $A_{n+1}$); and further including a symbol source (1);
   and a single place entrance storage device ($A_0$) for connecting the input side of said storage means with said symbol source.

3. Apparatus as defined in claim 2, and further including place shifting means (B) including a plurality of shifting units ($B_1$ through $B_n$)) having the same number of places as, and respectively connected in parallel with the place groups of storage units of, said storage means (A).

4. Apparatus as defined in claim 3, and further including
   pulse responsive counting and codifying means (F) for generating extinguishing (5) and shifting (6) signals;
   means (E, F, G) providing place shifting conditioning signals (7);
   extinguishing AND gate means (M) responsive to said extinguishing and conditioning signals for extinguishing the storage units of a given group of said storage means;
   first shifting AND gate means (L) responsive to said conditioning (7) and place shifting (6) signals for producing a control signal;
   and a plurality of second shifting AND gate means (K) associated with the storage units of said group, respectively, said second shifting AND gate means being responsive to said control signal and to data signals from the storage units, respectively, of the preceding group, whereby data is shifted to said group in a stepwise manner from the said preceding group.

5. Apparatus as defined in claim 2, and further including pulse responsive counting and codifying means (F) for generating extinguishing (5) and shifting (6) signals;
   a plurality of first switching circuit means (N) for supplying said extinguishing and shifting signals to all the storage units of each of said groups;
   and a plurality of AND circuit means (O) associated with each of said storage units, respectively, said AND circuit means being responsive to said extinguishing and shifting signals and to the data signal from the corresponding storage unit of the preceding group, whereby data is shifted to said group in a stepwise manner from said preceding group.

6. Apparatus as defined in claim 1 wherein said storage means (A) is of the multiple place type including a plurality of place groups of storage units;
   and further including a symbol source (1);
   and a pair of entrance storage means ($A_{01}$, $A_{02}$) a first one ($A_{02}$) of which is operable to connect said symbol source with said storage unit groups and a second one ($A_{01}$) of which is operable to connect said storage unit groups with said first prestorage means.

7. Apparatus as defined in claim 6, and further including multi-place shifting means (B) having the same number of places as said storage means.

8. Apparatus as defined in claim 7, wherein the places of said shifting means being connected between said first prestorage means and the places of said storage means, and between the places of said storage means and said second prestorage means, respectively.

9. Apparatus as defined in claim 1, wherein said storage means is of the multiple place type including a plurality of place groups of storage units;
and further including pulse responsive counting and codifying means (F) for generating extinguishing and shifting signals;
additional counting means (R) having the same number of places as the storage means;
additional switch means (P) for operating said additional counting means;
and special shifting means (Q, 3)) connected with selected input (a) and output (b) places of said auxiliary counting means to control the blockwise shifting of data stored in said storage means.

10. Apparatus as defined in claim 9, wherein said special shifting means includes a special AND circuit (Q) having one input connected with said input place (a) and a second input connected with said additional switch means (P), said special AND circuit having a START output (3) for initiating the place shifting operation.

11. Apparatus as defined in claim 10, and further including stop switch means (H) connected with the output place (b) of said additional counting means for interrupting the place shifting operation.

12. Apparatus as defined in claim 11, and further including means (T) for blocking a predetermined group ($U_1$) of places of said storage means against operation by said extinguishing and shifting means (5/6).

References Cited
UNITED STATES PATENTS

| | | | |
|---|---|---|---|
| 3,341,817 | 9/1967 | Smeltzer | 340—172.5 |
| 3,328,766 | 6/1967 | Burns et al. | 340—172.5 |
| 3,311,896 | 3/1967 | Delmege et al. | 340—172.5 |
| 2,933,563 | 4/1960 | Hohmann | 340—172.5 |

GARETH D. SHAW, Primary Examiner